Dec. 22, 1931.  E. J. RUSSELL  1,837,631
SPRING POWER STORING MECHANISM
Filed Sept. 5, 1931  2 Sheets-Sheet 1

Inventor
Edward J. Russell.
By A. J. O'Brian
Attorney

Dec. 22, 1931.   E. J. RUSSELL   1,837,631
SPRING POWER STORING MECHANISM
Filed Sept. 5, 1931   2 Sheets-Sheet 2

Inventor
Edward J. Russell.
By A. J. O'Brien
Attorney

Patented Dec. 22, 1931

1,837,631

UNITED STATES PATENT OFFICE

EDWARD J. RUSSELL, OF DENVER, COLORADO

SPRING POWER STORING MECHANISM

Application filed September 5, 1931. Serial No. 561,345.

This invention relates to improvements in devices for storing energy and for returning the stored energy to a machine for the purpose of assisting in overcoming the inertia of the parts in starting.

In the operation of heavy machines that have to be started and stopped frequently, a large amount of energy is lost due to the fact that it is necessary to employ brakes or otherwise overcome the momentum of the moving part when bringing the machine to a stop, and then when the machine is to be again started, an equal amount of energy must be supplied for the purpose of overcoming the inertia of the stationary part and of accelerating them until they attain the speed desired. An example of a machine of the type to which reference is made is an automobile or automotive vehicle of any kind. When an automobile or truck is brought to a stop from a high speed, it is necessary to employ a brake mechanism for the purpose of absorbing the kinetic energy of the moving parts and this energy is therefore converted into heat and dissipated. When the automobile or truck is to be started, a large amount of extra energy is required to accelerate it. It can be easily demonstrated mathematically that the amount of energy required to bring a moving part from a velocity of V to a velocity of zero, is equal to the amount necessary to accelerate it and change its velocity from zero to V and therefore it is apparent that if the energy required to stop the moving parts is stored without loss in a spring motor, this same energy if properly applied will be sufficient to accelerate the parts until they change their original velocity, and therefore stopping and starting can be accomplished without the expenditure of any additional power or energy.

This invention, briefly described, consists of a spring motor of such construction that it can be readily applied to an automobile or truck and which is provided with one or more springs that are adapted to store energy. One end of the spring or springs is connected to a rotatable abutment that is held against rotation in one direction by means of a friction band and the other end or ends are provided with gears which are adapted to mesh with a gear carried by a rotating shaft. Means is provided for bringing the gears into mesh when the automobile is to be stopped and the parts are so arranged that when the gears are in mesh, the forward motion of the automobile will wind the spring, thereby interposing a resistance that is equivalent to the action of the brake and at the same time storing the energy, that would otherwise be lost, in the springs. After the machine has been brought to a stop, and when it is again to be started, a reversing mechanism is brought into play whereby the energy stored in the springs will be redelivered to the automobile in such a direction that this energy will serve to start the automobile.

Having thus briefly described the invention, the same will now be described in detail, and for this purpose reference will be had to the accompanying drawings in which the preferred embodiment of the invention has been illustrated, and in which.

Figure 1:
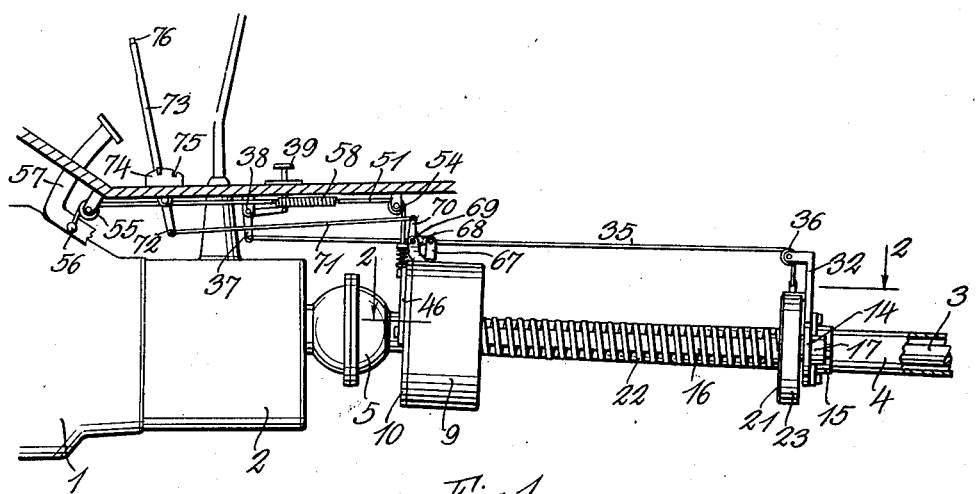
Fig. 1 is a side elevation of the rear end of an automobile engine, the transmission housing and the drive shaft, and shows my improved spring motor in place.

In the drawings reference numeral 1 represents a portion of the automobile engine and 2 the transmission gear housing, while reference numeral 3 indicates the drive shaft, which is enclosed in a tube 4. The drive shaft 3 is connected with the drive shaft of the transmission gear by means of a universal coupling located in housing 5. Since there is nothing new in respect to the engine and the transmisson gear, these parts have not been shown in detail, and only such parts of the automobile have been shown as cooperate with my improved energy storing device.

Figure 2:
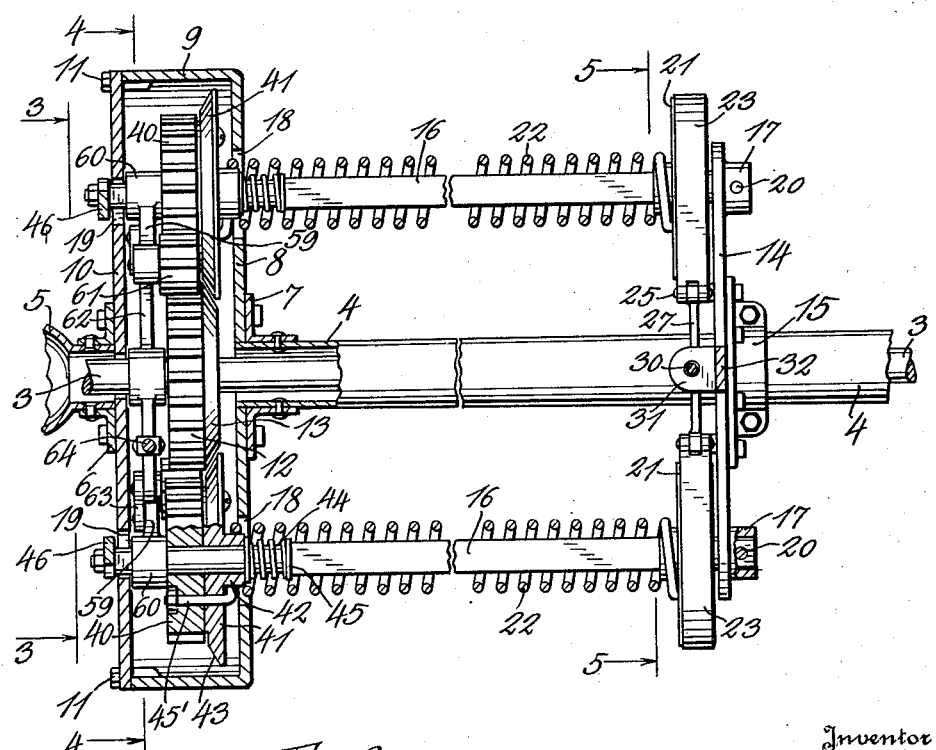
Fig. 2 is a section taken on line 2—2, Fig. 1.

When my invention is applied to an automobile of ordinary construction, the tube 4 terminates a short distance from the flange 6 which is shown in Fig. 2 as applied to the rear end of the universal housing. A circular flange 7 is connected with the front end of the tube 4 and located between flanges 6 and 7 is a gear housing which consists of a bottom or back member 8 having sides 9 extending at right angles to it in the manner shown in Figs. 2 and 4. The open end of this housing is closed by means of a removable cover plate 10 that is held in place by cap bolts 11. Secured to the drive shaft 3 is a gear 12. This gear is provided with an inclined or frusto-conical friction surface 13 for a purpose which will appear hereinafter. A plate 14 is secured to the outside of tube 4 by means of clamps 15. Shafts 16 have one end extending through openings in hubs 17 and have their other ends extending through the aligned openings 18 and 19 in the bottom 8 and removable cover 10 of the gear housing. Since these shafts do not have to rotate, the central section may be square if desired. Pins 20 hold the shaft 16 against rotation. Mounted on the shafts adjacent the front surface of plate 14 are two rotatable spring abutments and friction drums 21. These drums or abutments are freely rotatable on shaft 16 and each one has the end of a spring 22 attached to it in the manner shown quite clearly in Figs. 2 and 5. Friction bands 23 have one end anchored to pins 24 and the other ends pivotally connected at 25 with the upper ends of arms 26 of bell crank levers whose other arms have been indicated by reference numeral 27. These bell cranks are pivoted at 28. The adjacent ends of arms 27 are connected by means of links 29, to which a bolt 30 is connected. The upper end of this bolt passes through a perforated lug 31 that is carried by the upwardly extending portion 32 which may be formed integral with plate 14 or may be attached to the latter. The lower end of bolt 30 is threaded for the reception of an adjusting nut 33 and the coil spring 34 encloses the bolt between the nut and the lug 31. Secured to the upper end of bolt 30 is a cable 35 that passes over a pulley 36. When spring 34 is under compression, it exerts a force tending to clamp the bands 23 against the outside of the pulleys and by means of nuts 33 the clamping action of these bands can be adjusted to the extent desired. By exerting tension on the cable 35, the brake bands can be released so as to permit drums 21 to rotate. This is useful in many cases and will be referred to hereinafter. By referring to Fig. 1 it will be seen that one end of cable 35 is connected to the lower end of bell crank lever 37 which is pivoted at 38 and which can be rotated about its pivot by exerting pressure on the plunger 39.

Mounted for rotation on the front end of each of the shafts 16 is a gear 40. This gear is adapted to mesh with gear 12 on shaft 3. The openings 18 and 19 are of sufficient size so that the shafts 16 may be moved towards and away from shaft 3 a sufficient distance to bring the gears 12 and 40 into and out of engagement. Associated with each gear 40 is a friction gear 41. This friction gear has a central hub 42 and a bevelled surface 43 that is adapted to engage with the bevelled surface 13 and gear 12. Coil springs 44 are placed between the outer ends of hubs 42 and a washer 45 carried by the shaft. These springs tend to move the friction gears forwardly but permit them to slide slightly when the gears are put into mesh. The springs 22 have one or more turns surrounding hubs 42 and are each provided with a projection 45' that extends through openings in the friction gears and in gears 42 as shown quite clearly in Fig. 2.

Figure 3:
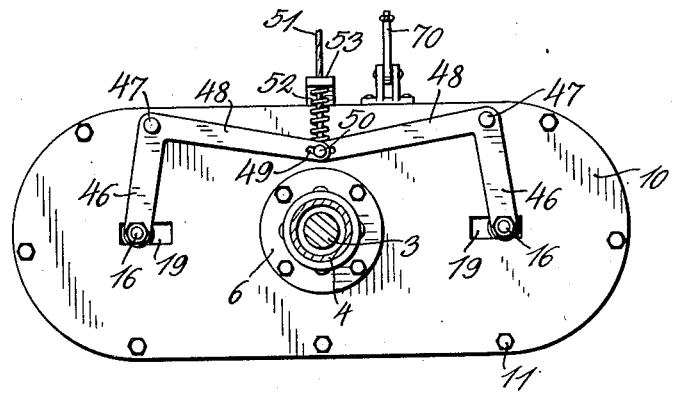
Fig. 3 is an end view, partly in section, taken on line 3—3, Fig. 2.

Referring now to Fig. 3 it will be seen that the front end of each shaft extends through an opening in the downwardly extending arm 46 of a bell crank lever that is pivoted at 47. The other arms of these bell crank levers have been designated by reference numeral 48 and preferably overlap each other as shown. The extreme ends of arms 48 are provided with slots 49 through which extends a pin 50. A cable 51 is attached to the pin 50. A spring 52 encloses the lower end of cable 51 and has its upper end in engagement with the lower surface of lug 53. The tension of spring 52 is sufficient to move the gears out of mesh and to hold them in this position. Cable 51 extends over pulleys 54 and 55 and has its end attached at 56 to the brake pedal 57. A spring 58 is introduced in the cable 51 so that it will yield. When pressure is applied to the brake pedal, the tension in cable 51 will move the arms 48 upwardly and move the gears 40 into engagement with the gear 12. By further pressure on the brake pedal, the ordinary wheel brakes will be applied in the usual way.

With the parts arranged in the manner described above and applied to the automobile as shown in Fig. 1, we will now assume that the automobile is running on a down grade and it is the intention of the driver either to retard its speed or to bring it to a complete stop. The first operation on the part of the driver is to exert pressure on the brake pedal whereupon the gears are brought into mesh in the manner described. It will hereinafter appear that the springs 22 are normally free from tension and therefore there is no great shock experienced when the gears are brought into mesh, but, for the purpose of bringing the gears 40 into synchronism with gear 12 before the cogs mesh, gear 12 has been provided with a friction surface 13 with which the friction surfaces 43 of friction gears 41 cooperate, and therefore as soon as these friction surfaces engage one another, the gears 40 will start to move with the result that they will be in motion when the cogs interlock and the meshing of the gears will therefore be effected without shock. As soon as the gears are brought into mesh they will be rotated in such a way as to wind springs 22. The strength and also the length of these springs can be proportioned so as to obtain the capacity necessary for bringing the automobile to a gentle stop within the distance usually required. When the automobile is running on the flat ground, it will be brought to a stop before the springs are fully wound, but if due to its high velocity this should not occur, there is no danger of breakage because the tension of the brake bands 23 is adjusted in such a way that the drums will slip before the springs will break. If the car is running down hill and it is desired to retard its motion by means of the spring motor attachment, this can be done by meshing the gears in the manner described and then releasing the drums from time to time in such a way that the springs will be wound several times in succession while going down a long steep hill. It is not the intention to have the drums 21 rotate under a high degree of friction while the car travels down the hill because this would generate too much heat and burn the brake bands. But, as indicated above, the bands 23 are released from time to time, thereupon letting the drums rotate quite freely in a direction to unwind the spring.

Figure 4:
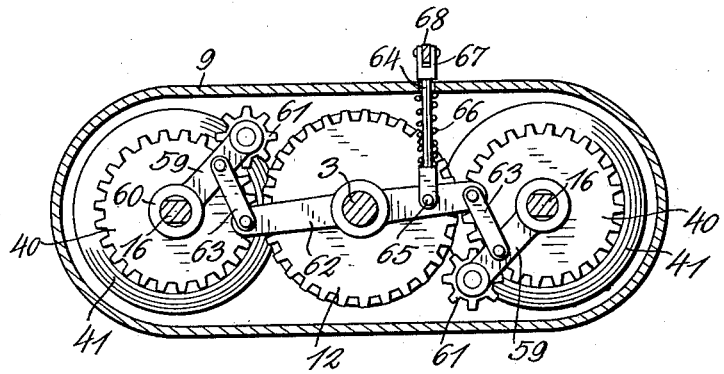
Fig. 4 is a section taken on line 4—4, Fig. 2.
Figure 5:
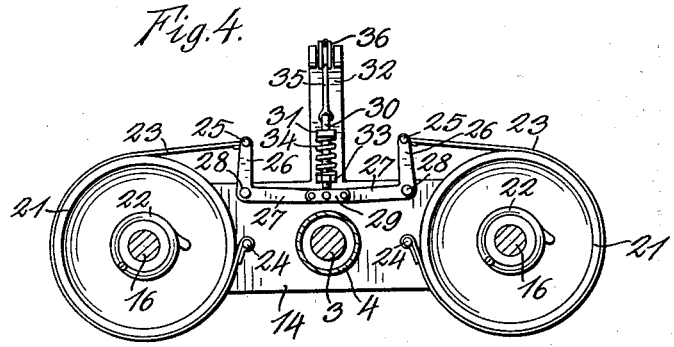
Fig. 5 is a section taken on line 5—5, Fig. 2.

Having now brought the automobile to a stop and stored sufficient energy in the springs to generate the power necessary to accelerate the automobile in starting, we will now explain how this power is transmitted to the machine. It is apparent that when gears 40 are in mesh with gear 12 and the springs wound in the manner above described, the motor will exert a force tending to run the automobile backward, and therefore before this power can be employed for the purpose of starting the automobile, the relative rotation between gears 12 and 40, must be reversed, and this is effected by the following mechanism. Referring now more particularly to Figs. 4 and 2, it will be seen that an arm 59 has one end provided with a hub 60 through which the shaft 16 extends. The other end of this arm is provided with a pinion 61. The pinion is in mesh with gear 40 and is held out of engagement with gear 12 by means of a lever 62 that is pivotally mounted on shaft 3. Links 63 extend from the ends of lever 62 to arms 59. A rod 64 extends through an opening in the wall of the gear casing and has its lower end pivotally attached to the lever 62 by means of a pin 65. This rod is surrounded by a spring 66 that is under compression and tends to hold the pinions in the position shown in Fig. 4. Secured to the upper end of rod 64 is a connecting head 67 to the upper end of which the arm 68 of a bell crank lever is pivoted. This bell crank lever is mounted for oscillation about a pivot 69 and its upper end 70 is attached to a rod 71 whose lower end is pivotally connected at 72 with the lower end of a lever 73. This lever cooperates with a quadrant 74 that has two notches 75 and is provided with a latching mechanism having an operating button or handle 76. When lever 73 is in the position shown in Fig. 1, the pinions will be in the position shown in Fig. 4; but, if lever 73 is moved so as to bring the latch into engagement with notch 75, the lever 62 and arms 59 will be turned about their pivots so as to bring the pinions into engagement with gear 12. When the pinions are moved into operative engagement, they force the gears 40 away from gear 12 and as soon as gears 40 and gear 12 get out of mesh, the power stored in the spring will be transmitted to shaft 3 in such a direction that it will move the automobile forwardly, and in this manner the energy stored during the stopping of the car will be delivered to the same in such a way that it will overcome the inertia and assist in accelerating the automobile so as to bring it up to speed. As soon as all the energy has been transferred from the springs to the automobile, the further motion of the automobile will tend to wind the springs from the opposite direction and at this point the pinions 61 should be moved back into the position shown in Fig. 4, but, if this is not done immediately no harm will come to the machinery, because the brake bands 23 are so applied to the drums 21 that when a force tends to turn these drums in the opposite direction, the brake bands will exert very little friction and the drums will therefore rotate freely. It is also apparent that when the pinions are in mesh with the gears, there will be a tendency to move the pinions out of mesh if power is delivered from gear 12 through the pinions to gear 40, and therefore there is no tendency for the parts to bind when lever 73 is moved to the position shown in Fig. 1.

In the above description the invention has been explained by means of a specific mechanism applied to an automobile, but it is to be understood that a similar mechanism can be applied to any machine that requires a brake for stopping it and by this means power can be stored during the stopping of the machine for starting it. The specific mechanism shown and described is illustrative only and applicant does not consider that his invention is limited to the specific structure, but considers his invention to consist in means for accomplishing the results desired regardless of the specific form in which the several elements of the combination are found.

Having described the invention what is claimed as new is:

1. A device for use in stopping and starting a machine having a large amount of momentum and inertia and provided with a rotatable shaft, comprising a spring having one end attached to a rotatable abutment, friction means for holding the abutment against rotation, the other end of the spring being attached to another abutment that is rotatable with respect to the first, means interposed between the shaft and the second abutment for rotating the latter for the purpose of winding the spring, and means movable into position between the shaft and the second abutment for reversing the direction of motion whereby the energy stored in the spring can be transferred to the shaft for the purpose of starting the machine.

2. In an automotive vehicle having a drive shaft, a gear secured to the drive shaft, a gear housing carried by the drive shaft, a rotatable abutment mounted for rotation in the housing, said abutment comprising a gear adapted to mesh with the gear carried by the drive shaft, said abutment gear being movable into and out of mesh with the gear on the drive shaft, means for holding the two gears out of engagement with each other, means for moving the two gears into engagement with each other, a second rotatable abutment spaced from, but axially aligned with the first, a friction brake associated with the second abutment, means for controlling the brake, a helical spring interposed between the abutments and connected with each whereby when the abutments rotate relative to each other, the spring tension will be altered and means for interposing an idler between the gear on the drive shaft and the gear on the first abutment whereby the energy stored in the spring when it is wound will be delivered to the drive shaft in such a way that it will assist in stopping the car.

3. In an automotive vehicle having a drive shaft, a gear secured to the drive shaft, a gear housing carried by the drive shaft, a rotatable abutment mounted for rotation in the housing, said abutment comprising a gear adapted to mesh with the gear carried by the drive shaft, said abutment gear being movable into and out of mesh with the gear on the drive shaft, resilient means for holding the two gears out of engagement with each other, means for moving the two gears into engagement with each other, a second rotable abutment spaced from but axially aligned with the first, a friction brake associated with the second abutment, resilient means for normally holding the friction brake in operative position, means for releasing the brake, a helical spring interposed between the abutments and connected with them at its ends whereby when the abutments rotate relative to each other the tension of the spring is changed, an idler carried by the first abutment and means for moving the idler into position between the two gears whereby their direction of rotation will be reversed and whereby the energy stored in the spring during the stopping of the vehicle will be transmitted to the shaft in a direction to assist in starting the vehicle and overcoming its inertia.

4. In an automotive vehicle having a drive shaft, a gear secured to the drive shaft, a gear housing carried by the drive shaft, a rotatable abutment mounted for rotation in the housing, said abutment comprising a gear adapted to mesh with the gear carried by the drive shaft, said abutment gear being movable into and out of mesh with the gear on the drive shaft, resilient means for holding the two gears out of engagement with each other, means for moving the two gears into engagement with each other, friction drive means associated with the gears and adapted to become operative before the gear teeth are brought into mesh, a second rotatable abutment spaced from but axially aligned with the first, a friction brake associated with the second abutment, means for controlling the brake, a helical spring interposed between the abutments and connected with each whereby when the abutments rotate relative to each other the spring tension will be altered and means for interposing an idler between the gear on the drive shaft and the gear on the first abutment whereby the energy stored in the spring when it is wound will be delivered to the drive shaft in such a way that it will assist in starting the car.

5. In an automotive vehicle having a drive shaft, a gear secured to the drive shaft, a gear housing carried by the drive shaft, a rotatable abutment mounted for rotation in the housing, said abutment comprising a gear adapted to mesh with the gear carried by the drive shaft, said abutment gear being movable into and out of mesh with the gear on the drive shaft, resilient means for holding the two gears out of engagement with each other, means for moving the two gears into engagement with each other, friction drive means associated with the gears and adapted to become operative before the gear teeth are brought into mesh, a second rotatable abutment spaced from, but axially aligned with the first, a friction brake associated with the second abutment, resilient means for normally holding the friction brake in operative position, means for releasing the brake, a helical spring interposed between the abutments and connected with them at its ends whereby when the abutments rotate relative to each other the tension of the spring is changed, an idler carried by the first abutment and means for moving the idler into position between the two gears whereby their direction of rotation will be reversed and whereby the energy stored in the spring during the stopping of the vehicle will be transmitted to the shaft in a direction to assist in starting the vehicle and overcoming its inertia.

In testimony whereof I affix my signature.

EDWARD J. RUSSELL.